Nov. 24, 1959 B. BEAMAN ET AL 2,914,088

FLUID FLOW REGULATING MEANS

Filed Jan. 26, 1956 2 Sheets-Sheet 1

INVENTOR.
BERNARD BEAMAN
BY JULIUS HULMAN

HIS ATTORNEYS

INVENTOR.
BERNARD BEAMAN &
BY JULIUS HULMAN

HIS ATTORNEYS

United States Patent Office 2,914,088
Patented Nov. 24, 1959

2,914,088

FLUID FLOW REGULATING MEANS

Bernard Beaman and Julius Hulman, Dayton, Ohio, assignors to United Hydraulics, Inc., Dayton, Ohio, a corporation of Ohio Application January 26, 1956, Serial No. 561,581

2 Claims. (Cl. 137—625.3)

This invention relates to a fluid flow regulating means and more particularly to a fluid flow control device capable of controlling fluid flow accurately over a wide range.

Fluid flow control devices, as heretofore produced, are capable of regulating fluid flow accurately over a limited range of flow. In accordance with applicants' invention a device is provided having a flow-position characteristic curve, whereby it is possible to obtain accurate control over a wide range of flows.

An object of this invention is to provide a device utilizing three basic modes of flow: viscous, viscous-turbulent and turbulent. The viscous mode of fluid flow control enables low quantity metering under high pressure. The turbulent mode of control enables high quantity flow at low pressure. The viscous-turbulent mode enables control of intermediate flows at various pressures. However, the valve is suitable for both high and low pressures at any of the various modes of control.

Another object of this invention is to provide a flow regulating device of this type that is motor driven, so as to enable remote or automatic flow control.

Other objects and advantages reside in the construction of parts, the combination thereof and the mode of operation, as will become more apparent from the following description.

Figure 3:
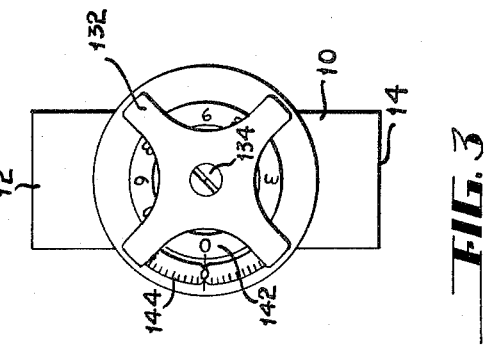
Figure 3 is an end view, as viewed from the right of Figure 2.

Referring to the drawings, the fluid control means herein disclosed includes a main body 10 which is provided with an intake passage 12 and an outlet passage 14, or vice versa, that is, either passage may be used as an inlet and the other as an outlet. A longitudinal bore 16 extends throughout the length of the main body 10. This bore is provided with annular channels 18 and 20, the annular channel 18 communicating with a passage 22 extending from the channel 18 to the intake port or passage 12. The channel 20 communicates with a passage 24, connecting this channel to the outlet port or passage 14.

Figure 5:
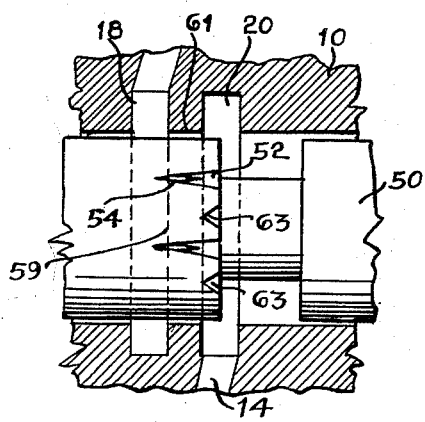

A piston 50 is mounted in the longitudinal bore 16 and is axially movable relative to said bore 16. A portion of piston 50 contains a V-groove, or grooves, of predetermined shape. As shown in Figures 1, 2, 4, 5 and 6, a portion of the V-groove 52 tapers or flares outwardly in two directions more rapidly than a pointed portion 54. The portion 59 of the piston extending beyond the point of the V-grooves, and having a substantially uniform diameter, will be referred to as the viscous metering land. Bore 16, likewise, includes a land portion 61 between annular grooves 18 and 20. For the condition of relative displacement, shown in Figure 4, wherein the lands of piston and bore are in substantial coincidence, the flow passage is effectively an annular capillary restriction by virtue of a clearance dimension of the order of .0002″ or less between piston and bore lands and a minimum required length of land. Fluid flow through this equivalent capillary annular tube will be of a viscous nature under a wide range of applied pressure, the controlled rate of flow being a function of land length. Cylindrical surfaces for lands 59 and 61 may commonly be employed. However, other surface shapes, including tapered or conical shapes, and also other cross sectional shapes for the piston and bore, as elliptical, square, et cetera, may be utilized to obtain an effective annular capillary restriction. For a succeeding portion of the relative displacement, the V-groove slots engage annular chamber or groove 18 for the portion 54 of the groove, as shown in Figure 5. A gradual increase in flow area is thus provided and the mode of flow corresponds to viscous-turbulent.

Figure 6:
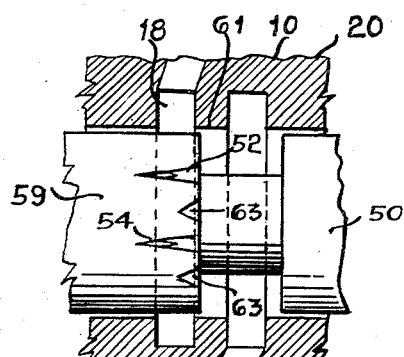
Figure 7:
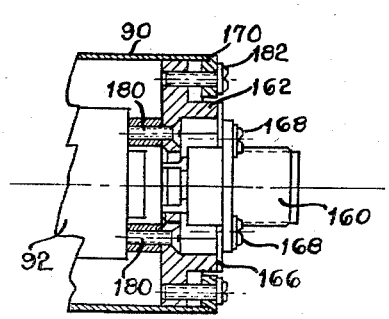
Figure 7 is a fragmentary, sectional view of the right end of the device disclosed in Figure 1.

As shown in Figure 6, for the remaining portion of the relative displacement, the portion 52 of the V-groove engages the annular channel 18, thus providing an abrupt change in flow area. Mode of flow for this engagement corresponds to turbulent flow. Supplementary slots 63 of broader shape may be employed to enable the required abrupt change in flow area. Although tapered, triangular-shaped slots are shown, a variety of shapes and cross sections are conceivable to effect the desired characterized flow.

Figure 2:
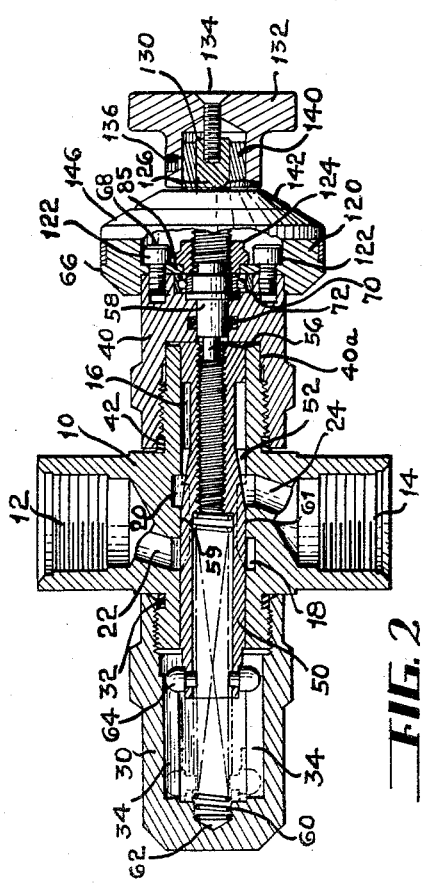
Figure 2 is a longitudinal cross sectional view of a manually adjustable fluid flow control device.
Figure 4:
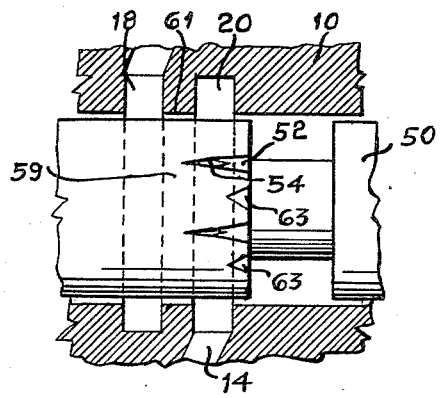
Figures 4, 5 and 6 are developed views of the circumferential surface of the bore superimposed on its mating piston surface, showing relative displacement positions for viscous, viscous-turbulent and turbulent flow control conditions.

Relative displacement of piston and bore is obtained as shown in Figure 2. A capping member 30 is threaded upon one end of the main body 10. A suitable gasket or sealing unit 32 seals the juncture between the end of the capping member and the main body 10. This capping member 30 is provided with a pair of longitudinally extending grooves 34 which engage a pair of diametrically opposed pins 64 seated in the end of piston 50, thereby preventing rotation of piston 50.

Figure 1:
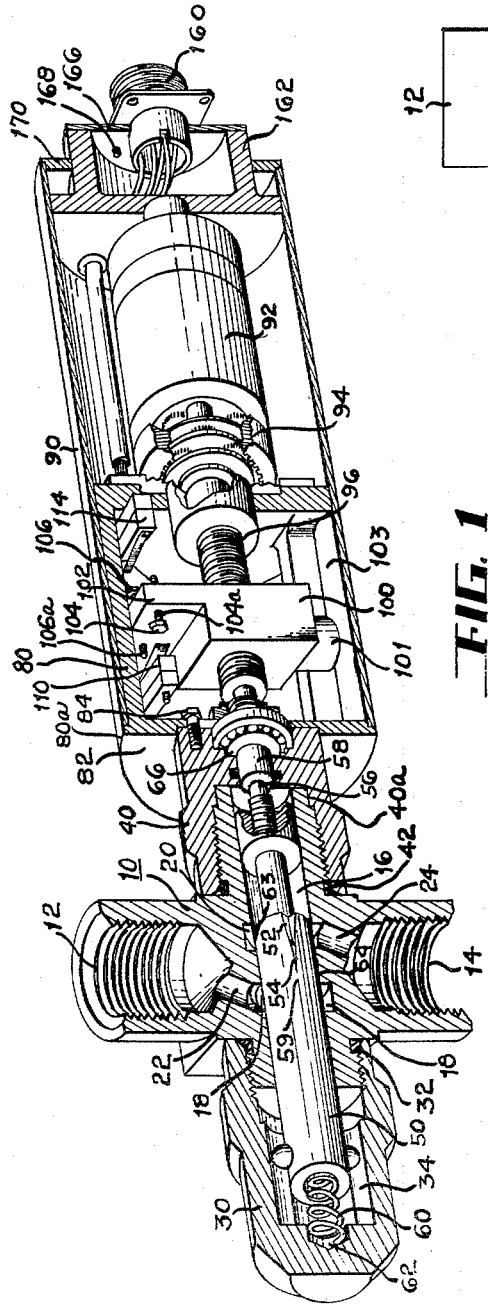
Figure 1 is a perspective, longitudinal cross sectional view of a motor driven fluid flow control device, with parts broken away.

A spring 60, having one end seated in a cylindrical recess 62 in the capping member 30 and the other end seated against a shoulder in the piston member 50, always biases the piston 50 towards the right, as viewed in Figures 1 and 2, so as to eliminate backlash. The opposite end of the main body 10 contains a thread and pilot portion having a diameter snugly seated in a recess in a stem housing member 40. The juncture between the main body 10 and the housing member 40 is sealed by a suitable gasket 42.

A valve stem 56 is supported by a bearing assembly 70, the inner race of which is secured to the stem by the nut 124 and an annular shoulder 66. An O ring 72 is contained in an annular groove in the housing member 40. This O ring bears on the cylindrical portion 58 of the stem 56 to prevent leakage of fluid. The stem housing member 40 contains a cavity to receive the outer race of bearing assembly 70. A cover member 120, shown in Figure 2, is secured to the stem housing by screws 68 and properly aligned by a pilot portion 40a having a diameter seated in a recess in the cover member 120. The flange portion 85 of the cover member 120 serves as a lip to securely fasten the outer race of the bearing assembly in the stem housing. Stem 56 is thereby free to rotate; but is restrained from axial movement. The portion of the stem 56 internal of the seal contains a thread which engages an internal thread in piston 50. A rotational motion imparted to the stem results in an axial displacement of the piston 50 in bore 16. For manual rotation of the stem, the projecting end 130 of the stem has mounted thereon a hand wheel 132, secured in position by a screw 134. Another screw, or the like, 136, is used in non-rotatably mounting the hand wheel upon a tubular extension 140 of a dial member 142 mounted in association with the graduated scale 144 mounted on the bevelled margin 146 of member 120. By rotating the hand wheel 132, the valve stem 56 is rotated so as to move the piston 50 to the right or to the left, as viewed in Figure 2.

In addition to manual operation, the fluid flow regulating means may be motor driven, as shown in Figure 1. A housing member 80 has an end wall 82 attached to the end of the nipple-like member 40 by screws 84. The housing member 80 is surrounded by a cylindrical sleeve 90, forming a cover for an electric motor 92. This electric motor drives a speed reducing mechanism 94, which may be a planetary or other type gear system, so as to drive a threaded coupling member 96 having one end fixedly connected to the end of the valve stem 56 and the other to the drive shaft of the motor. When the motor rotates in one direction, the piston 50 is actuated towards the left, as viewed in Figure 1, to increase the flow of fluid, and vice versa.

A suitable stop mechanism is provided for stopping the electric motor and reversing the direction of rotation of the electric motor. This stop mechanism includes a nut 100 threadedly mounted upon the threaded coupling member 96. This nut is restrained from rotation by pin 101 and slot 103 in the housing 80; but is free to move axially to the left or to the right, as the case may be, when the motor 92 is energized. The nut 100 is provided with an upwardly directed flange 102, as viewed in Figure 1. This flange 102 has mounted therein a contact 104 and a second contact 106. The contact 104 engages an electric switch 110, to limit or control the extent of motion in the left direction. The switch 110 may either reverse the direction of rotation or stop the electric motor, as the case may be, depending entirely upon the type of circuit used. The contact 106 is mounted so that when the nut 100 is moved towards the right, as viewed in Figure 1, it engages a second electric switch 114 to reverse or stop the motor in the opposite direction. The switches 110 and 114, cooperating with the contacts 104 and 106 mounted upon the nut 100, may function as limit switches, so that the movement of the piston 50 is limited in both directions by the contacts 104 and 106. As may be readily seen by referring to Figure 1, the contacts 104 and 106 are supported upon adjusting screws 104a and 106a and securely locked by lock nuts which may be adjusted. By this arrangement, any reduced range and limits of fluid flow control within the full operating range and flow limits of the valve may be selected.

A quick disconnect type of electrical connecting plug 160 for the motor and electrical wires is securely attached to a mounting adapter 162. Adapter 162 is secured to the frame of the motor 92 by screws 180. A cover 166 fits over a portion of adapter 162 and is secured by screws 168. The cylindrical sleeve 90 is securely clamped between the flanges 80a of the housing 80 and cover 170. By removing screws 182, the cover 170 and cylindrical sleeve 90 may be easily removed for ready access to the interior portions of the drive assembly and without disturbance or removal of electrical connections.

Although in the preferred embodiment a land having a fixed diameter between the inlet port and the outlet port has been shown in association with a piston having a land of uniform diameter merging into a diameter that permits a greater flow of fluid, namely, the V-grooves 52 and 54, these parts could be reversed. The fixed land between the inlet port and the outlet port could be located in the piston member and the main body member could have a bore, a portion of which is of uniform diameter and another portion provided with V-grooves or any other suitable increase in fluid flow passage, the piston member and the main body member having a relative movement to thereby control the flow.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. A metering valve for metering the flow of fluids comprising a housing having a main bore; inlet and outlet passages in said housing communicating with said bore; a land area in said housing interposed between said passages and forming a wall of said bore; a piston member axially movable in said bore, said piston member being provided with a land area confronting said housing when the valve is in closed position, said confronting land areas forming a capillary passageway extending longitudinally of the bore between the inlet and outlet thereby to provide a leakage path therebetween, and upon axial movement of said piston away from closed position said land areas being progressively positioned out of confronting relation thereby to shorten the capillary leakage path and vary the leakage flow between inlet and outlet in a desired exponential manner with axial movement of the piston; and thin elongated metering grooves in one of said members consisting of at least a pair of superimposed groove portions which overlap and are a continuation of the same channel, said grooves being located after said land area; whereby upon continued movement of said piston toward open position, the fluid flow is varied in a desired exponential manner.

2. A metering valve for metering the flow of fluids comprising a cylindrical housing member having a main bore; inlet and outlet passages in said housing member communicating with said bore; a land area in said housing member interposed between said passages and forming a wall of said bore; a piston member axially movable in said bore and being of cylindrical configuration, said piston being provided with a land area of such extent and so arranged with respect to the passages and land area of said housing member as to substantially fully seal off flow between said passages in one extreme position of said piston, and upon movement of said piston towards its other extreme position said land areas cooperating to regulate the leakage flow to maintain the flow-position characteristic at the desired exponential relationship; and thin elongated V-cross-sectional shape metering grooves in said piston member consisting of at least a pair of superimposed groove portions which overlap and are a continuation of the same channel, said grooves being located after said land area; whereby a very minute elongated groove is presented to said inlet to progressively open said inlet passage to said bore upon continued movement of the piston thereby to maintain the fluid flow along a desired exponential curve.

References Cited in the file of this patent

UNITED STATES PATENTS

| | | |
|---|---|---|
| 1,316,585 | Logan | Sept. 23, 1919 |
| 1,510,802 | Scott | Oct. 7, 1924 |
| 2,276,195 | Holmes | Mar. 10, 1942 |
| 2,315,389 | Benson | Mar. 30, 1943 |
| 2,541,176 | Rockwell | Feb. 13, 1951 |
| 2,629,264 | Krow | Feb. 24, 1953 |
| 2,685,294 | Gold | Aug. 3, 1954 |